Figure 1:
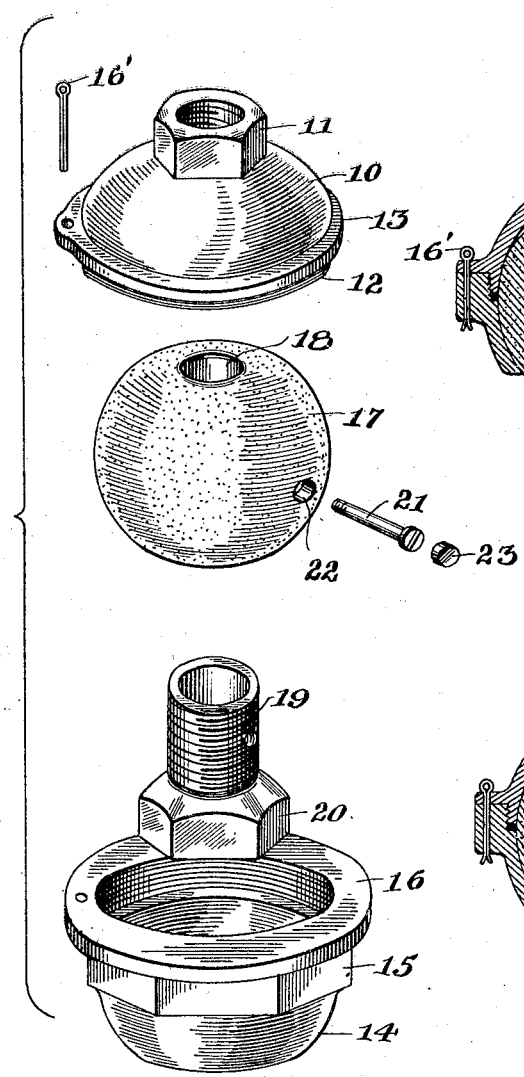

Oct. 13, 1931.  W. C. WHITE  1,827,500

FLEXIBLE PIPE JOINT

Filed Oct. 26, 1927

Inventor
W. C. White
By Lacey & Lacey,
Attorneys

Patented Oct. 13, 1931

1,827,500

UNITED STATES PATENT OFFICE

WALTER C. WHITE, OF LOS ANGELES, CALIFORNIA, ASSIGNOR TO INTERNATIONAL COUPLERS CO., OF PITTSBURGH, PENNSYLVANIA, A COMMON-LAW TRUST

FLEXIBLE PIPE JOINT

Application filed October 26, 1927. Serial No. 228,960.

This invention relates to an improved flexible pipe joint particularly designed for use in connection with fluid pressure systems and has as one of its principal objects to provide a joint of the ball and socket type wherein the ball will itself be of a nature to provide a sealed joint between the ball and socket.

The invention has as a further object to provide a joint wherein the ball will be formed as an integral body of packing material.

And the invention has as a still further object to provide a joint wherein the pipe receiving member carried by the ball will be detachably connected thereto so that, when found necessary, the ball may be readily renewed.

Other and incidental objects will appear hereinafter.

Figure 2:
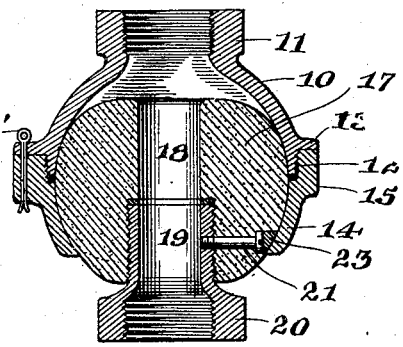
Figure 3:
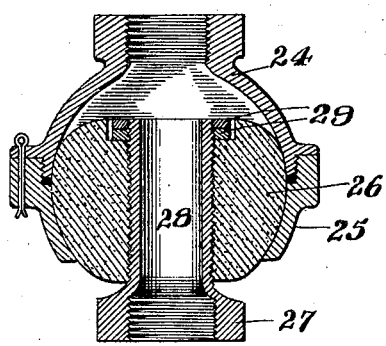

In the drawings:

Figure 1 is a perspective view showing my improved joint disassembled, the parts, however, being in proper relative position, Figure 2 is a sectional view showing the joint assembled, and Figure 3 is a sectional view illustrating a slight modification of the invention.

The joint of the present invention is of the ball and socket type. For convenience, the socket will be first described. This socket includes a socket cup 10 provided with a nipple 11 to receive a pipe and formed on the cup is a flange 12 at the inner end of which is arranged a radial stop shoulder 13. Threaded upon said flange is an annular socket nut 14 conforming in contour to the contour of the cup and provided with an enlarged wrench receiving portion 15 surmounted by a flange 16 abutting said shoulder. Removably engaging through the shoulder, the flange, and said wrench receiving portion, is a key 16' locking the cup and nut together.

Snugly fitting within the socket is the joint ball 17, the inner faces of the socket cup and nut being machined so that close fitting contact will be had between the ball and socket. The ball 17 is formed as an integral body of packing material. Any approved material may be employed but must be expansible, the ball being absorbent and subject to swelling. Thus, the ball will expand within the socket to at all times provide a sealed joint between the ball and socket. Formed through the ball is a fluid passage 18 and threaded into the outer end portion of said passage is the tubular stem 19 of a pipe nipple 20, the outer end portion of the passage being counterbored to receive said stem. The nipple 20 corresponds, of course, to the nipple 11 of the socket. Removably fitted through the ball at one side thereof is a radial locking pin 21 threaded through the stem 19 of the nipple 20 and having the head thereof countersunk in a recess 22 in the ball. Closing said recess is a plug 23 conforming at its outer end face to the contour of the ball and formed of packing material similar to that employed in constructing the ball. As will be seen, the pin 21 will rigidly lock the nipple 20 upon the ball while, should it be so desired, the nipple may be readily detached so that the ball may, when found necessary, be easily renewed. I accordingly provide a joint which, as will be appreciated, is of extremely simple construction.

In Figure 3 of the drawings, I have illustrated a slight modification of the invention. In this modification, the socket cup is indicated at 24 and the socket nut at 25. The ball is indicated at 26. All of these parts are similar to corresponding parts of the preferred construction and cooperate in a similar manner. A pipe nipple 27 is provided for the ball and the tubular stem 28 of this nipple is elongated and is threaded entirely through the ball. Locking the nipple upon the ball are superposed locking nuts 29 engaged with the inner end portion of said stem and countersunk in the adjacent end of the ball. These nuts will, therefore, serve the same function as the locking pin 21 of the preferred construction and in this connection it will be observed that the stem 28 of the nipple will reinforce the ball throughout the length of its diameter. In other respects, this modified form of the invention is identical with the preferred embodiment thereof and further description is accordingly believed unnecessary.

Having thus described the invention, what is claimed as new is:

A flexible pipe joint comprising a ball formed of absorbent swellable material approximating wood in rigidity, said ball being flattened at diametrically opposite points thereof and having an axial bore opening through the flattened portions of the ball, a socket receiving the ball and comprising a cup and a nut threaded together, one flattened portion of the ball protecting exteriorly of said nut and forming a seat, and the other flattened portion of the ball opposing the inner face of the cup and forming an extended space between the cup and ball for subjecting the ball to direct contact with the moisture and pressure of the fluid passing through the joint, an interiorly threaded nipple integral with said cup and having wrench faces, and an exteriorly threaded nipple screwed into the axial opening of the ball in alinement with said cup nipple and having an internally threaded end provided with wrench faces and seated on the seat provided by said exposed flat portion of the ball.

In testimony whereof I affix my signature.

WALTER C. WHITE. [L. S.]